United States Patent
Yasukouchi et al.

(10) Patent No.: US 7,250,745 B2
(45) Date of Patent: Jul. 31, 2007

(54) CONTROL CIRCUIT OF DC-DC CONVERTER AND ITS CONTROL METHOD

(75) Inventors: Katsuyuki Yasukouchi, Kasugai (JP); Hidenobu Ito, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/973,257

(22) Filed: Oct. 27, 2004

(65) Prior Publication Data

US 2005/0285579 A1   Dec. 29, 2005

(30) Foreign Application Priority Data

Jun. 25, 2004   (JP) ............................. 2004-187918

(51) Int. Cl.
*G05F 1/40* (2006.01)
(52) U.S. Cl. ...................... 323/284; 323/285
(58) Field of Classification Search ......... 323/282–290
See application file for complete search history.

(56) References Cited

U.S. PATENT DOCUMENTS 4,107,596 A * 8/1978 Weaver et al. ............... 323/271
5,939,871 A * 8/1999 Tanaka ........................ 323/285
5,949,226 A * 9/1999 Tanaka et al. ............... 323/285

FOREIGN PATENT DOCUMENTS

JP   06-303766   10/1994

* cited by examiner

*Primary Examiner*—Rajnikant B. Patel
(74) *Attorney, Agent, or Firm*—Arent Fox, LLP

(57) ABSTRACT

In a DC-DC converter of synchronous rectifying system, a control circuit of DC-DC converter capable of improving the control voltage value of output voltage at light load and enhancing the power conversion efficiency, and its control method are presented. An inverting input terminal of comparator COMP2 of which non-inverting input terminal is connected to a grounding potential is connected to one terminal of choke coil L1 by way of terminal (X). An output terminal (N1) of comparator COMP2 is connected to a delay circuit DL, and an output terminal (N2) of delay circuit DL is connected to AND gate circuit AND1. The delay circuit DL is a circuit for delaying the transition from high level to low level of input terminal (N1). Excessive power supplied more than demanded by the load at light load is returned to choke coil L1. Elevation of output voltage VOUT due to excess power accumulated in output capacitor C1 can be suppressed.

21 Claims, 9 Drawing Sheets

CIRCUIT DIAGRAM IN CASE STRUCTURE OF FIRST EMBODIMENT IS APPLIED TO STEP-DOWN DC-DC CONVERTER

CIRCUIT DIAGRAM IN CASE STRUCTURE OF FIRST EMBODIMENT IS APPLIED TO STEP-DOWN DC-DC CONVERTER

WAVEFORM DIAGRAM SHOWING OPERATION IN CASE OF LIGHT LOAD ON DC-DC CONVERTER OF FIG.1

(1) : ACCUMULATED IN L1
(2) : DISCHARGED TO C1
(3) : ACCUMULATED IN L1
(4) : DISCHARGED IN (IN)

FIG. 3  CIRCUIT DIAGRAM IN CASE VARIATION OF FIRST EMBODIMENT IS APPLIED TO STEP-DOWN DC-DC CONVERTER

CIRCUIT DIAGRAM IN CASE STRUCTURE OF SECOND EMBODIMENT IS APPLIED TO STEP-DOWN DC-DC CONVERTER

CIRCUIT DIAGRAM IN CASE STRUCTURE OF THIRD EMBODIMENT IS APPLIED TO STEP-DOWN DC-DC CONVERTER

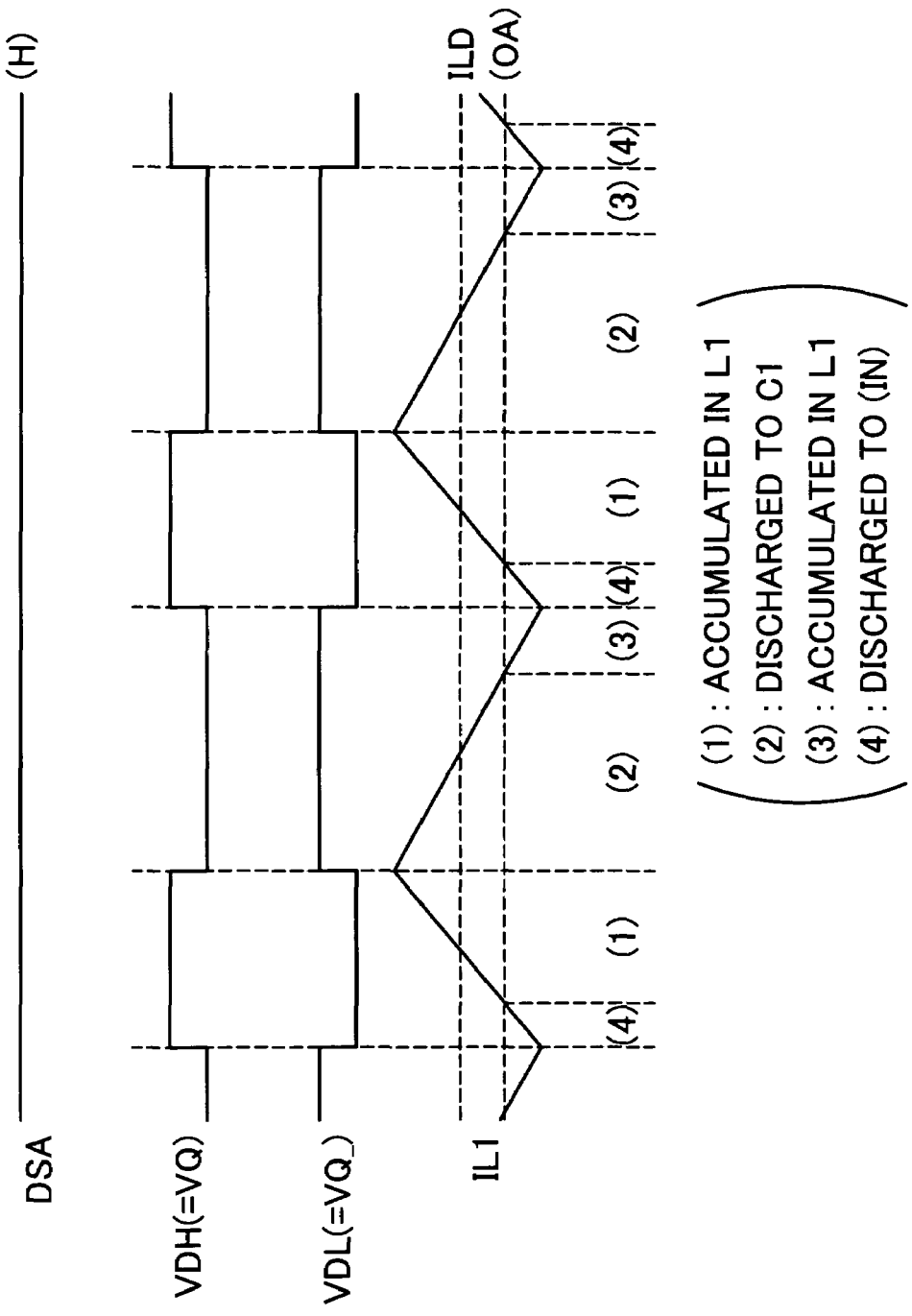
FIG. 6 WAVEFORM DIAGRAM SHOWING OPERATION IN CASE OF LIGHT LOAD ON DC-DC CONVERTER OF FIG.4

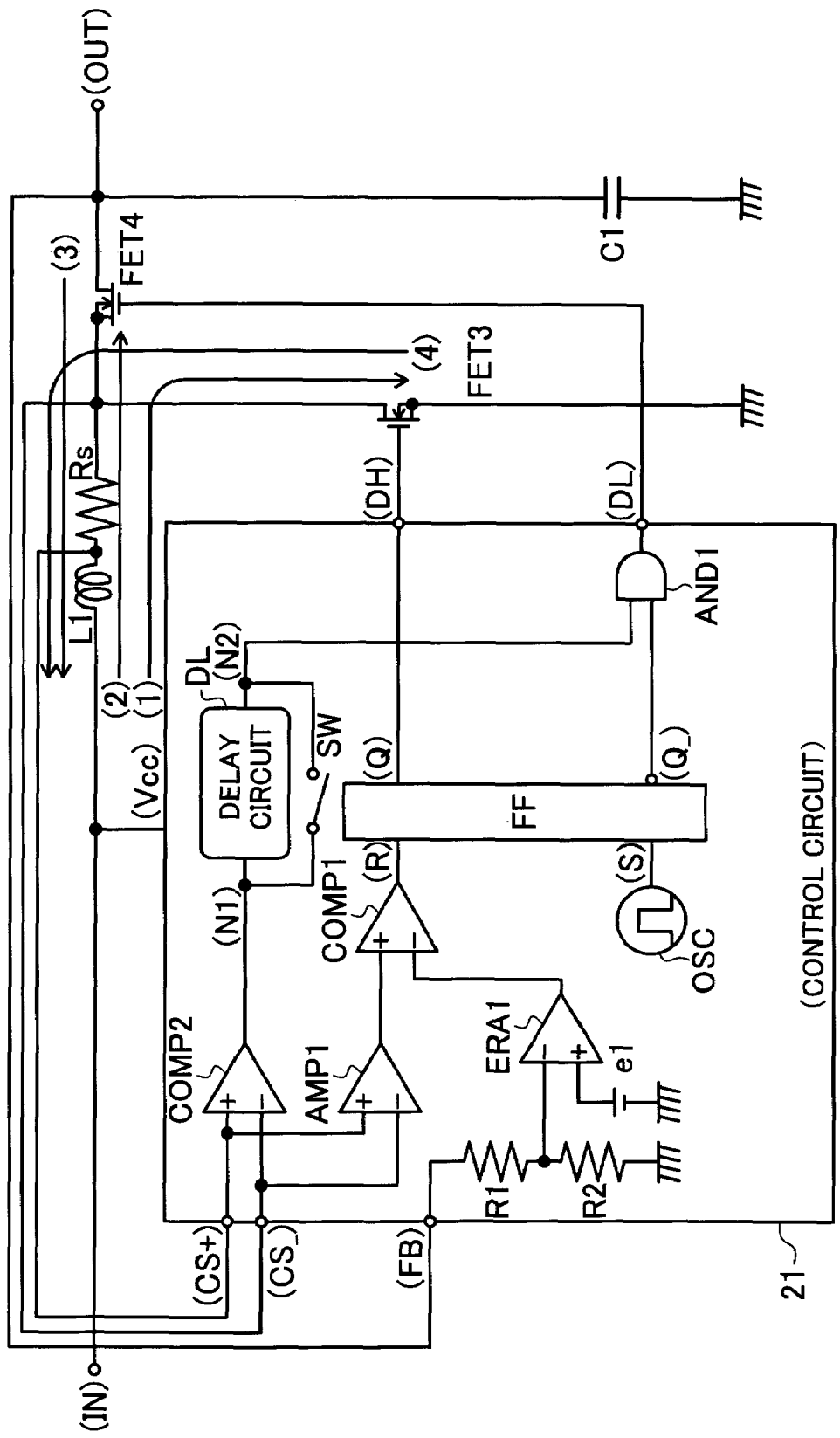
FIG. 7 CIRCUIT DIAGRAM IN CASE STRUCTURE OF FIRST EMBODIMENT IS APPLIED TO BOOSTING DC-DC CONVERTER

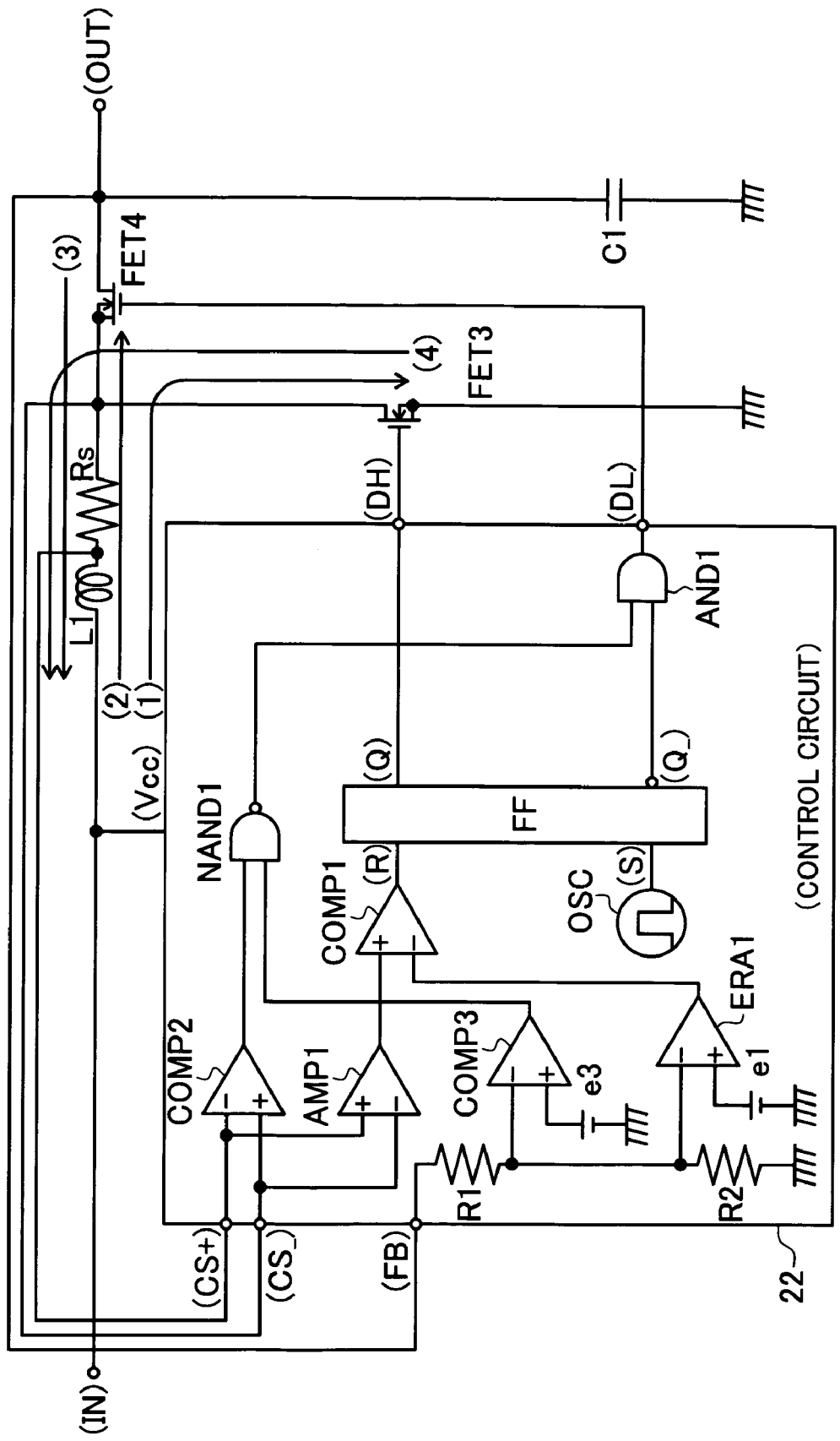
FIG. 8 CIRCUIT DIAGRAM IN CASE STRUCTURE OF FOURTH EMBODIMENT IS APPLIED TO BOOSTING DC-DC CONVERTER

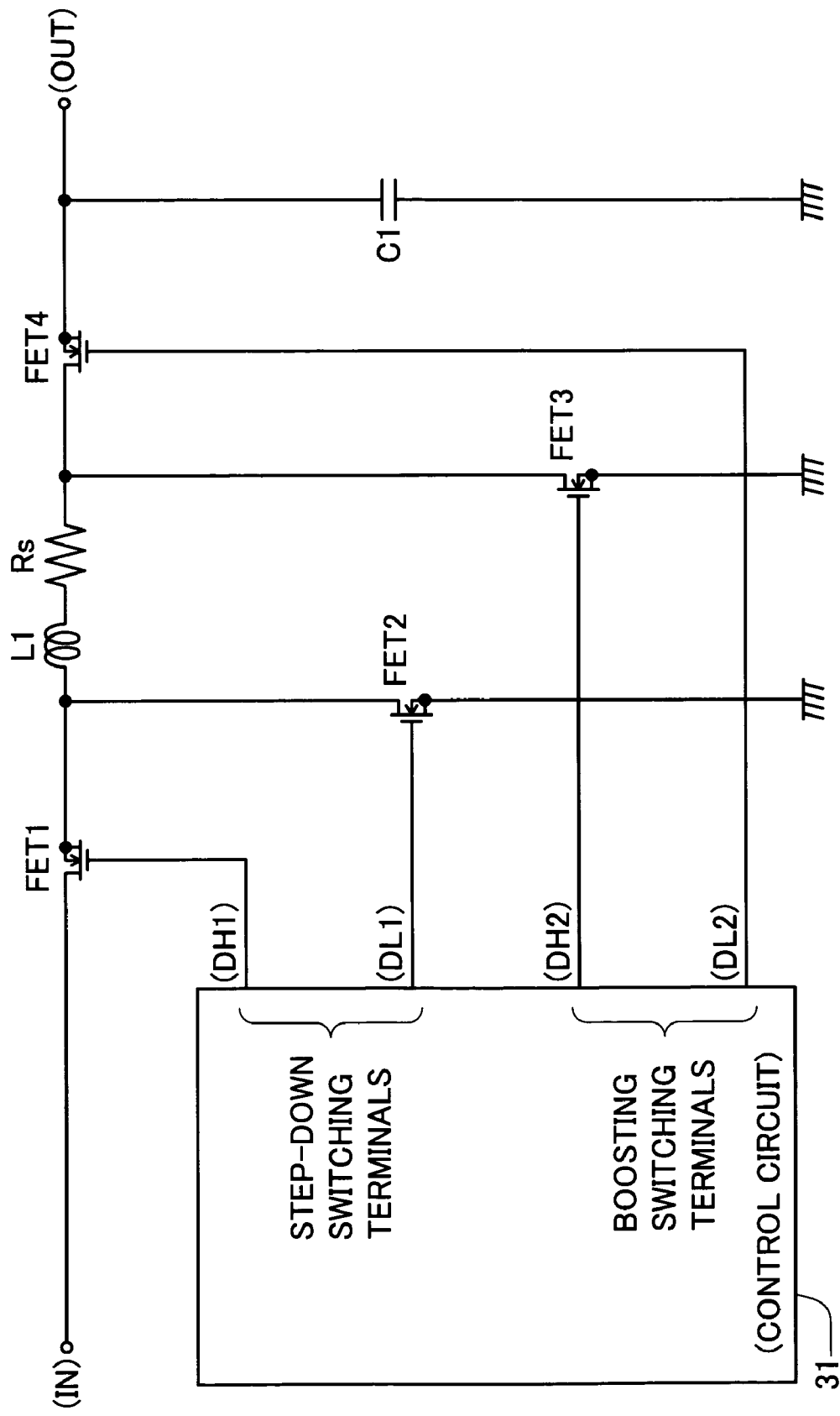
FIG. 9 CIRCUIT DIAGRAM SHOWING EXAMPLE OF BOOSTING/STEP-DOWN DC-DC CONVERTER

CONTROL CIRCUIT OF DC-DC CONVERTER AND ITS CONTROL METHOD

CROSS-REFERENCE TO RELATED APPLICATIONS

This application is based upon and claims the benefit of priority from the prior Japanese Patent Application No. 2004-187918 filed on Jun. 25, 2004, the entire contents of which are incorporated herein by reference.

BACKGROUND OF THE INVENTION

1. Field of the Invention

The present invention relates to control of DC-DC converter, and more particularly to control at light load in DC-DC converter of synchronous rectifying system.

2. Description of the Related Art

A personal digital assistant operates on battery power, but along with power consumption by continued operation of the device, the battery power is consumed and the battery output voltage declines with the passing of the time. In order to maintain a constant voltage level of the device power source in spite of such time course changes of the battery voltage, the supply voltage is stabilized by a DC-DC converter.

The DC-DC converter used in the personal digital assistant is particularly required to be high in the efficiency of power conversion. It is necessary to minimize the power loss in order to extend the operating time of the device until the battery is recharged or replaced. The DC-DC converter of synchronous rectifying system comprises a synchronous switching element which conducts in synchronism with the timing of discharging the electric power accumulated in the choke coil to the load side. The synchronous switching element is a switching element having a rectifying action which is usually non-conducting, and establishes a current path by conducting at the timing of passing the discharge current to the load. As compared with ordinary rectifying element such as diode, it is intended to decrease the conduction loss.

When supplying power to the device by converting the battery voltage, a high efficiency is demanded in a wide load range from heavy load of large power supply to light load of small power supply. In this case, the power conversion efficiency tends to drop significantly at light load as compared with the time of heavy load. It is because the rate of power consumption of the DC-DC converter itself in the entire power consumption is relatively large.

To improve decline of power conversion efficiency at light load, a DC-DC converter of PFM (pulse frequency modulation) system is proposed. The PFM system is a bypass method of switching action depending on the output voltage of the DC-DC converter. By decimating the switching actions while the supply of load power is provided enough by the accumulated power of the output capacitor connected to the output terminal of the DC-DC converter, the power loss of the DC-DC converter is decreased, and it is intended to improve the power conversion efficiency at light load.

In the PFM system, however, the switching period varies depending on the load power, and it may be noise source for the device and adverse effects may be considered. Accordingly, a DC-DC converter of PWM (pulse width modulation) system is proposed, which is intended to perform switching action at a specific period in synchronism with the clock signal oscillated at a specific frequency. Because the switching action is done at specific frequency, it is effective for devices likely to have adverse effects by fluctuations of switching frequency.

Another DC-DC converter is proposed for controlling by changing over the PFM system operation and PWM system operation depending on the load. An example of this technology is disclosed in Japanese Laid-open Patent No. H6(1994)-303766. In ordinary operation including heavy load, the operation is based on the PWM system, and at light load, it is changed over to the PFM system. As a result, while improving the power conversion efficiency at light load, adverse effects on the device in ordinary operation can be decreased. In Japanese unexamined patent publication No. H6(1994)-303766, the switching action is controlled by fixing the OFF time specifically, but in the nearly fixed state of voltage values of input voltage and output voltage, the switching duty is nearly specific, and the switching action can be done nearly at specific frequency. Therefore, the switching action control at specific OFF time may be also regarded as PWM system.

SUMMARY OF THE INVENTION

In the DC-DC converter shown in the background art, however, when the supply power is larger than the load power at light load, the power supply is excess. As a result of accumulation of excess power in the output capacitor, the output voltage may be elevated higher than the control voltage.

In particular, when the switching action by the PWM system at light load, if the ON time of power supply transistor by the switching action is very short, since the switching action is done by force at fixed frequency, the power of each period is supplied to the output terminal. Depending on the load power amount, the excess power amount accumulated in the output capacitor is increased in every switching period, and the output voltage climbs up regardless of the voltage control, and finally control may be disabled.

In this case, generally, by connecting a dummy load between the output terminal and reference potential, electric power of excess supply can be discharged. This is the connection of so-called bleeder resistance. By connecting a bleeder resistance, excess power is discharged, and the output voltage does not fall in uncontrollable state. However, regardless of the magnitude of load power, a power loss occurs in the bleeder resistance as a fixed power loss, and in particular the power conversion efficiency at light load cannot be improved.

The invention is intended to solve at least one of the problems of the background art, and it is hence an object thereof to present a control circuit of DC-DC converter capable of improving the control voltage of output voltage and improving the power conversion efficiency at light load in a DC-DC converter of synchronous rectifying system, and its control method.

To achieve the object, a control circuit of DC-DC converter in a first aspect of the invention is a control circuit of DC-DC converter having a first switching element for conducting when electric power is accumulated in an inductive element, and a second switching element for conducting by switching control corresponding to discharge period of electric power accumulated in the inductive element to a load, which further comprises a detector for monitoring a first current flowing with a negative inclination to the time by conduction of the second switching element, and detecting when reaching a predetermined current value by inversion of current direction, and a conduction controller for making the second switching element non-conductive depending on the detection result by the detector.

In the control circuit of DC-DC converter of the first aspect of the invention, the second switching element conducts by switching control corresponding to the discharge period of the electric power accumulated in the inductive element to the load, and the voltage between terminals of the inductive element is inverted, and a first current flows at a negative inclination to the time, and thus so-called synchronous rectifying action is carried out. The detector detects when the first current continues to decrease until the current direction is inverted, and increases in the opposite direction to reach a predetermined current value. The conduction controller receives the result of detection, and makes the second switching element non-conductive.

A control method of DC-DC converter in the first aspect of the invention is a control method of DC-DC converter having a first current path for conducting when electric power is accumulated in an inductive element, and a second current path for conducting corresponding to discharge period of electric power accumulated in the inductive element to a load, in which a first current flowing with a negative inclination to the time is detected until reaching a predetermined current value by inversion of current direction, and the second current path is made non-conductive depending on the detection result.

In the control method of DC-DC converter of the first aspect of the invention, the second current path conducts corresponding to the discharge period of the electric power accumulated in the inductive element to the load, and synchronous rectifying action is carried out, and when the first current continues to flow at negative inclination to the time by inversion of voltage between terminals of the inductive element, and then, after the current direction is inverted, increases in the opposite direction to reach a predetermined current value, thereby making the second current path non-conductive.

Accordingly, when discharging the accumulated power of the inductive element to the load, the second switching element or second current path conducts, and the voltage between terminals of the inductive element is inverted from the time of accumulating power. At this moment, an electric power is accumulated depending on the current flowing in the inductive element. When this current reaches the peak current, the time inclination of the first current flowing toward the load decreases with the passing of the time, and the electric power is discharged, and when the current value of the first current becomes zero, discharge of power is complete, but the conduction of the second switching element or second current path continues thereafter. Hence, the flowing direction of the first current is inverted, the current begins to flow from the load toward the inductive element. Depending on this flow, the load side power is moved and accumulated in the inductive element. In a state of small power consumption at the load, if the power discharged to the load side is excess, by maintaining the conductive state of the second switching element or second current path over the power discharge period of the inductive element, the excess current can be returned to the inductive element. As a result, the excess power accumulated at the load side can be decreased, and elevation of output voltage due to excess power can be suppressed.

The electric power returned to the inductive element is regenerated at the input side after the second switching element or second current path is made non-conductive, and the excess power can be returned to the input side, and the power conversion efficiency of the DC-DC converter can be enhanced. This is achieved by installing an element having a rectifying function from the inductive element to the input side. Matching with the timing of regeneration, the first switching element or first current path can be made conductive, or when using MOS transistor as first switching element or first current path, the power can be regenerated by using the body diode of the MOS transistor.

At this time, the second switching element or second current path is made non-conductive as the current value of the first current inverted and flowing reaches the predetermined current value, and the excess power moving from the load side to the inductive element is limited to the power amount corresponding to the predetermined current value. When the predetermined current value is set depending on the excess power amount, excessive power is not returned to the inductive element from the load side, and excess power can be returned to the inductive element and further to the input side. As a result, if the power consumption is small as compared with the power discharge amount to the load, the electric power is not excessively returned, and the output voltage is closer to the control voltage value.

In particular, it is suitable to the case of switching action by PWM system at light load. That is, by switching action in predetermined period by PWM system, if excess power is discharged in every period toward the load side, the excess power can be returned to the inductive element in every period, and elevation of output voltage can be suppressed. It is hence not necessary to use dummy load such as bleeder resistance at the load side. In the case of switching action by PWM system at light load, too, the output voltage can be maintained at the control voltage. Further at this time, not accompanied by additional power consumption by bleeder resistance, the excess power returned to the inductive element can be regenerated at the input side, and the power conversion efficiency can be enhanced.

A control circuit of DC-DC converter in a second aspect of the invention is a control circuit of DC-DC converter having a first switching element for conducting when electric power is accumulated in an inductive element, and a second switching element for conducting by switching control corresponding to discharge period of electric power accumulated in the inductive element to a load, which further comprises a counterflow detector for monitoring a first current flowing with a negative inclination to the time by conduction of the second switching element, and detecting the inversion of current direction, a voltage detector for detecting when the output voltage of the DC-DC converter is equal to or less than a predetermined voltage, and a conduction controller for making the second switching element non-conductive depending on the detection result by the counterflow detector and the voltage detector.

In the control circuit of DC-DC converter of the second aspect of the invention, the second switching element conducts by switching control corresponding to the discharge period of the electric power accumulated in the inductive element to the load, and the voltage between terminals of the inductive element is inverted, and a first current flows at a negative inclination to the time, and thus so-called synchronous rectifying action is carried out. The counterflow detector detects inversion of current direction as the first current continues to decrease. The voltage detector monitors the output voltage of the DC-DC converter, and detects when becoming equal to or lower than a predetermined voltage. The conduction controller receives the results of these detections, and makes the second switching element non-conductive.

A control method of DC-DC converter in the second aspect of the invention is a control method of DC-DC converter having a first current path for conducting when electric power is accumulated in an inductive element, and a second current path for conducting corresponding to discharge period of electric power accumulated in the inductive element to a load, in which a first current flowing with a negative inclination to the time is detected when the current direction is inverted by conduction of the second current path, and the second current path is made non-conductive when the current direction of the first current is inverted and the output voltage is equal to or lower than a predetermined voltage value.

In the control method of DC-DC converter of the second aspect of the invention, the second current path conducts corresponding to the discharge period of the electric power accumulated in the inductive element to the load, and synchronous rectifying action is carried out, and when the first current continues to flow at negative inclination to the time by inversion of voltage between terminals of the inductive element, and then the current direction is inverted, and the output voltage of the DC-DC converter becomes equal to or lower than the predetermined voltage value, thereby making the second current path non-conductive.

Accordingly, when the current value of the first current is zero and discharge of power to the load is complete, if the output voltage is equal to or lower than the predetermined voltage value, the electric power accumulated at the load side is within an allowable range, and the second switching element or second current path is made non-conductive, and thereby transfer of the load side power to the inductive element can be blocked. If the output voltage is over the predetermined voltage value, the electric power accumulated at the load side is excess, and the second switching element or second current path is maintained in conductive state, and the load side power can be moved and returned to the inductive element. As a result, the excess power accumulated at the load side can be decreased, and elevation of output voltage due to excess power can be suppressed.

The electric power returned to the inductive element is regenerated at the input side after the second switching element or second current path is made non-conductive, and the excess power can be returned to the input side, and the power conversion efficiency of the DC-DC converter can be enhanced. This is achieved by installing an element having a rectifying function from the inductive element to the input side. Matching with the timing of regeneration, the first switching element or first current path can be made conductive, or when using MOS transistor as first switching element or first current path, the power can be regenerated by using the body diode of the MOS transistor.

At this time, the conductive state of the second switching element or second current path is controlled when the output voltage exceeds the predetermined voltage value. When the predetermined voltage value is set within an allowable range, excessive power is not returned to the inductive element from the load side, and only the electric power of which output value exceeds the predetermined voltage value can be returned as an excess portion to the inductive element and further to the input side. As a result, if the power consumption is small as compared with the power discharge amount to the load, the electric power is not excessively returned, and the output voltage is maintained within the predetermined voltage value.

In particular, it is suitable to the case of switching action by PWM system at light load. That is, by switching action in predetermined period by PWM system, if excess power is discharged in every period toward the load side, the excess power can be returned to the inductive element in every period, and the output voltage can be maintained within the predetermined voltage value. It is hence not necessary to use dummy load such as bleeder resistance at the load side, without being accompanied by additional power consumption, the excess power returned to the inductive element can be regenerated at the input side, and the power conversion efficiency can be enhanced.

A control circuit of DC-DC converter in a third aspect of the invention is a control circuit of DC-DC converter capable of selecting control of a DC-DC converter having a second switching element for conducting by switching control corresponding to discharge period of electric power accumulated in an inductive element to a load, between PWM fixed control for fixing the repetition period of operation cycle at predetermined period regardless of the load power amount, and PWM/PFM variable control for selecting the PFM system for expanding and contracting the repetition period of operation cycle depending on the load power amount at light load, which further comprises a counterflow detector for monitoring a first current flowing with a negative inclination to the time by conduction of the second switching element, and detecting the inversion of current direction, and a conduction controller for making the second switching element non-conductive depending on the detection result by the counterflow detector when the PWM/PFM variable control is selected, and maintaining the conductive state of the second switching element until power accumulation into the inductive element is started regardless of the detection result when the PWM fixed control is selected.

In the control circuit of DC-DC converter of the third aspect of the invention, in the DC-DC converter for performing the synchronous rectifying operation by the second switching element, when the operation modes of PWM fixed control and PWM/PFM variable control can be selected, the counterflow detector detects inversion of current direction of the first current. The conduction controller, when the PWM/PFM variable control is selected, makes the second switching element non-conductive depending on the counterflow detection of the first current, and when the PWM fixed control is selected, maintains the conductive state of the second switching element until accumulation of electric power into the inductive element is started regardless of the result of detection.

A control method of DC-DC converter in the third aspect of the invention is a control method of DC-DC converter capable of selecting control of a DC-DC converter having a first current pass for conducting when electric power is accumulated in an inductive element, and a second current pass for conducting corresponding to discharge period of electric power accumulated in the inductive element to a load, between PWM fixed control for fixing the repetition period of operation cycle at predetermined period regardless of the load power amount, and PWM/PFM variable control for selecting the PFM system for expanding and contracting the repetition period of operation cycle depending on the load power amount at light load, in which a first current flowing with a negative inclination to the time is detected when the current direction is inverted by conduction of the second current path, and the second current path is made non-conductive depending on the detection result of inversion of current direction when the PWM/PFM variable control is selected, while the conductive state of the second current path is maintained until accumulation of electric power into the inductive element is started regardless of the result of detection.

In the control method of DC-DC converter of the third aspect of the invention, in the DC-DC converter for performing the synchronous rectifying operation by the second current path, when the operation modes of PWM fixed control and PWM/PFM variable control can be selected, the second current path is made non-conductive depending on the counterflow detection of the first current if the PWM/PFM variable control is selected, and the conductive state of the second current path is maintained until accumulation of electric power into the inductive element is started regardless of the result of detection if the PWM fixed control is selected.

Accordingly, when the PWM fixed control is selected, the non-conductive control of the second switching element or second current path is suppressed, and it is allowed to invert the current direction of the first current, and hence at light load, switching action is performed at predetermined period by PWM system, and if excess power is discharged to the load side in every period, the excess power can be returned to the inductive element in every period, and excessive elevation of output voltage is suppressed, and it is maintained within a control voltage. At this time, it is hence not necessary to use dummy load such as bleeder resistance at the load side, without being accompanied by additional power consumption, and the excess power returned to the inductive element can be regenerated at the input side, so that the power conversion efficiency can be enhanced.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 6 is a waveform diagram showing operation of DC-DC converter in FIG. 4 at light load;

FIG. 7 is a circuit diagram of first embodiment applied in a boosting DC-DC converter;

FIG. 8 is a circuit diagram of a fourth embodiment applied in a boosting DC-DC converter; and FIG. 9 is a circuit diagram of an example of boosting step-down DC-DC converter.

DETAILED DESCRIPTION OF THE PREFERRED EMBODIMENTS

Preferred embodiments of the invention realized in control circuit of DC-DC converter and its control method are described specifically below while referring to FIG. 1 to FIG. 9.

Figure 1:
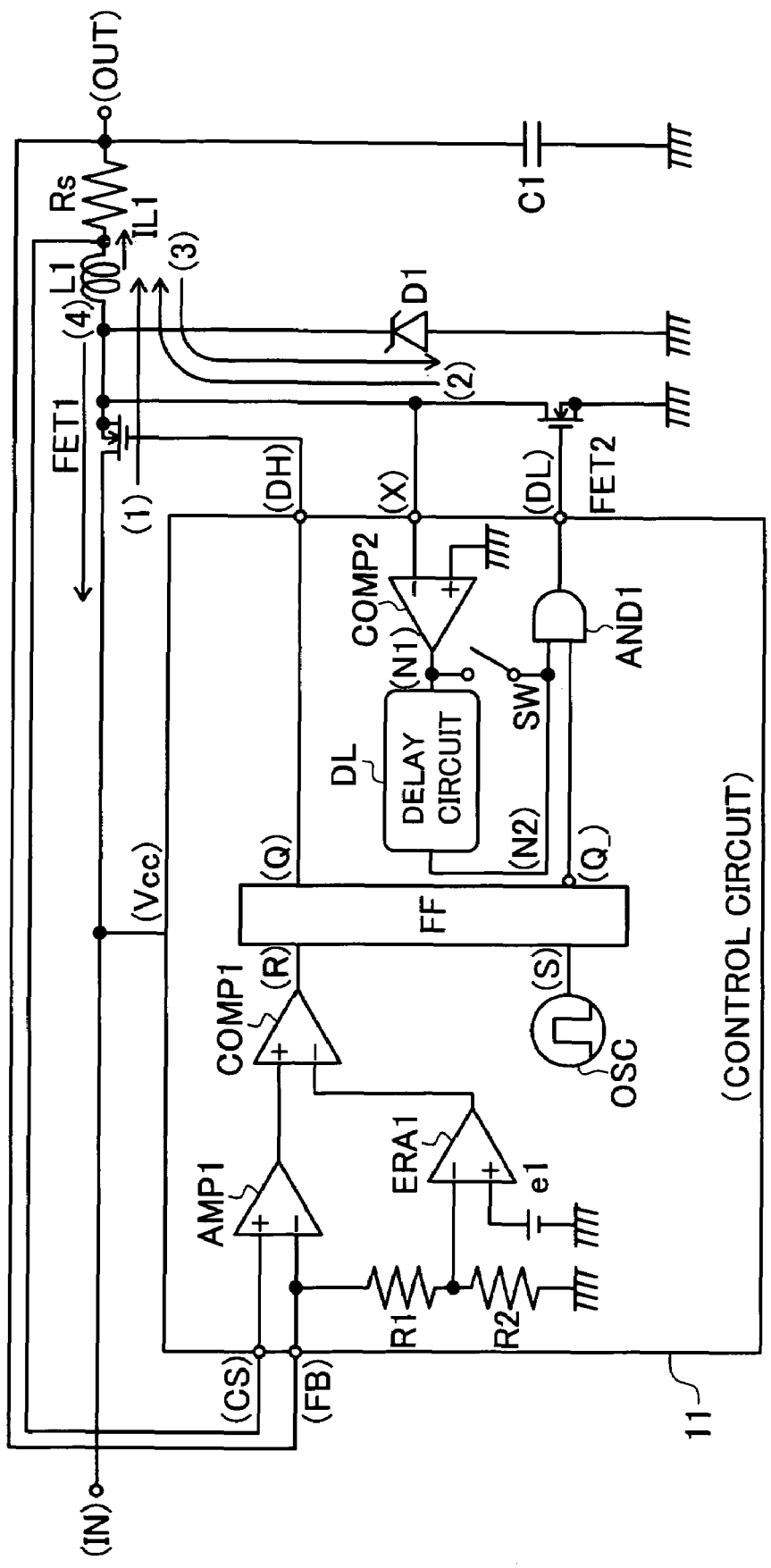
FIG. 1 is a circuit diagram of a first embodiment applied in a step-down DC-DC converter.

FIG. 1 is a circuit diagram of a first embodiment applied in a step-down DC-DC converter. The non-conductive timing of synchronous transistor which conducts when discharging an electric power to the load is delayed from the zero timing of discharge current toward the load after completion of power discharge. For the delayed period, the synchronous transistor is maintained in conductive state, and the discharge current is inverted, and the load side excess power is returned.

An input terminal (IN) in which input voltage VIN is supplied is connected to a drain terminal of NMOS transistor FET1. A source terminal of the NMOS transistor FET1 is connected to one terminal of choke coil L1 and a drain terminal of NMOS transistor FET2. A source terminal of the NMOS transistor FET2 is connected to a grounding potential. Gate terminals of the NMOS transistors FET1, FET2 are respectively connected to output terminals (DH), (DL) of a control circuit 11 which is described later. A diode element D1 is provided, with its anode terminal connected to a grounding potential and cathode terminal to one end of choke coil L1. It is disposed for the purpose of assisting the NMOS transistor FET2 having rectifying action by the switching operation described below.

Other terminal of the choke coil L1 is connected to an output terminal (OUT) by way of sense resistance Rs, and input voltage VIN is stepped down, and output as output voltage VOUT. In the output terminal (OUT), an output capacitor C1 is connected against a grounding potential in order to accumulate an electric power supplied through choke coil L1.

Herein, in source terminals of NMOS transistors FET1, FET2, generally, back gate terminals of NMOS transistors FET1, FET2 are connected. The back gate terminal is a well in internal structure of MOS transistor, and it corresponds to a P type conductive layer in NMOS transistor. Therefore, in NMOS transistors FET1, FET2, generally, PN junction structure is formed from the source terminal to the drain terminal by way of the back gate terminal. This is the so-called body diode structure. By the body diode, it has a rectifying action in reverse direction of ordinary current direction.

A control circuit 11 controls to maintain the output voltage VOUT at a predetermined voltage value when supplying power to the output terminal (OUT) by stepping down the input voltage VIN supplied from the input terminal (IN) by controlling to conduct the NMOS transistors FET1, FET2 alternately. In the circuit diagram in FIG. 1, switching control by PWM system is carried out by current mode control. The control circuit 11 has its input terminal (IN) connected to power source terminal (VCC), and input voltage VIN is supplied as supply voltage.

Both terminals of sense resistance Rs are connected to terminals (CS) and (FB), which are connected to non-inverting input terminal and inverting input terminal of amplifier AMP1, and the voltage between terminals of the sense resistance Rs is amplified. The terminal (FB) connected to the output terminal (OUT) is further connected to one terminal of resistance element R1 connected to a grounding potential by way of resistance element R2, and the connection point of resistance elements R1, R2 is connected to an inverting input terminal of error amplifier ERA1. Reference voltage e1 is applied to a non-inverting input terminal of error amplifier ERA1.

The output terminal of amplifier AMP1 and output terminal of error amplifier ERA1 are connected to non-inverting input terminal and inverting input terminal of comparator COMP1, and the output terminal of comparator COMP1 is connected to reset terminal (R) of a flip-flop circuit FF. A set terminal (S) of the flip-flop circuit FF is triggered by an oscillator OSC which oscillates in a predetermined period. An output terminal (Q) of the flip-flop circuit FF is connected to an output terminal (DH) of the control circuit 11, and an output terminal (Q_) is connected to an output terminal (DL) by way of AND gate circuit AND1.

The AND gate circuit AND1 receives a control signal when the NMOS transistor FET2 is made non-conductive by detecting the inverted state of coil current IL1. The inverting input terminal of comparator COMP2 of which non-inverting input terminal is connected to a grounding potential is connected to one terminal of choke coil L1 by way of terminal (X). An output terminal (N1) of the comparator COMP2 is connected to a delay circuit DL, and an output terminal (N2) of the delay circuit DL is connected to the AND gate circuit AND1.

The delay circuit DL is a circuit for delaying in the case of signal transition from high level to low level, without delaying in the case of signal transition from low level to high level of input terminal (N1). It is intended to delay the timing of detecting the inversion of coil current IL1 by the comparator COMP2.

A switch circuit SW is connected between output terminal (N1) of comparator COMP2 and output terminal (N2) of delay circuit DL, and it is intended to change over the path of detection signal by comparator COMP2 up to the AND gate circuit AND1, between a path passing the delay circuit DL and a path not passing. Although not shown in the diagram, when the control circuit 11 is composed so as to be capable of selecting between PWM fixed control for controlling by fixing to the switching action by PWM system, and PWM/PFM variable control for controlling by changing over from PWM system to PFM system at light load, it controls to make conductive for selection of PWM/PFM variable control, and make non-conductive for selection of PWM fixed control.

Figure 2:
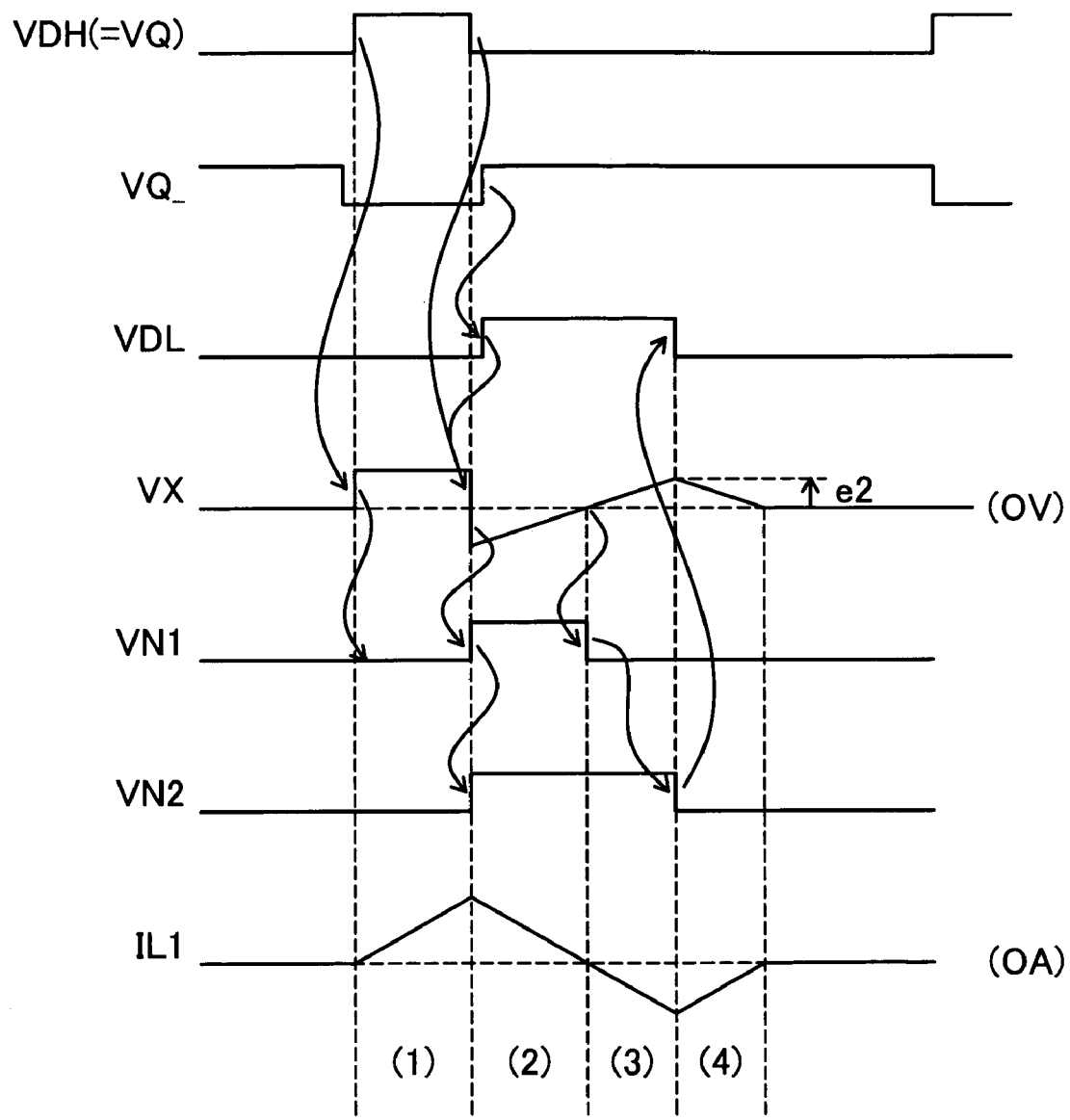
FIG. 2 is a waveform diagram showing operation of DC-DC converter in FIG. 1 at light load.

When the control circuit 11 is set in the PWM fixed control, the circuit operation at light load is explained in FIG. 2. By selection of PWM fixed control, the switch circuit SW is maintained in non-conductive state. FIG. 2 shows the switching operation of one period by PWM system.

In every period of oscillator OSC, the flip-flop circuit FF is set, and the output terminal (Q) is transferred to high level. This high level signal is outputted from output terminal (DH), and when high level signal is outputted as drive signal VDH, the NMOS transistor FET1 conducts. The voltage at the input terminal (IN) side of the choke coil L1 becomes nearly equal to input voltage VIN, and then an output voltage VOUT of lower voltage than the input voltage VIN is applied to the terminal at the output terminal (OUT) side, and the coil current IL1 flowing toward the output terminal (OUT) continues to elevate at predetermined time inclination. At this time, the inclination is determined by the physical characteristic of the inductance element. Supposing the inductance of choke coil L1 to be L, it is $di/dt=(VIN-VOUT)/L$. In the inductance element, since the electric power is accumulated in proportion to a square of current, the electric power proportional to a square of coil current IL1 is accumulated in the choke coil L1 along with passing of the time (FIG. 2 (1)). In this period, the drive signal VDL of output terminal (DL) is maintained at low level, and the NMOS transistor FET2 is maintained in non-conductive state.

Depending on the increase of coil current IL1, the output voltage of the amplifier AMP1 increases. Corresponding to the shortage portion of output voltage VOUT for the control voltage set depending on the reference voltage e1, the error amplifier ERA1 outputs a voltage, and when the output voltage of the amplifier AMP1 reaches this voltage, the comparator COMP1 is inverted, and the flip-flop circuit FF is reset. The NMOS transistor FET1 is non-conductive, and the current path from the input terminal (IN) is cut off, and the NMOS transistor FET2 conducts.

When a current path is formed in the choke coil L1 from the grounding potential by way of NMOS transistor FET2, the electric power accumulated in the choke coil L1 is discharged to the output terminal (OUT) side. As the NMOS transistor FET2 conducts, the input terminal (IN) side voltage of the choke coil L1 becomes nearly equal to the grounding potential, and the output voltage VOUT is applied to the terminal at the output terminal (OUT) side, and hence the coil current IL1 flowing from the choke coil L1 toward the output terminal (OUT) side declines at a predetermined time inclination. At this time, the inclination is determined by the physical characteristic of the inductance element, and supposing the inductance of choke coil L1 to be L, it is $di/dt=-VOUT/L$ (FIG. 2 (2)).

When the power consumption of the load connected to the output terminal (OUT) is small and the load is light, power may be supplied more than demanded by the load. The extra power not used is accumulated in the output capacitor C1 connected to the output terminal (OUT). By accumulation of unused power, the output voltage VOUT may climb up. In PWM fixed control, in particular, the power is supplied in every period by the oscillator OSC which oscillates in predetermined period even in light load state.

In the period of (2) in FIG. 2, the coil current IL1 flows, and the NMOS transistor FET2 is stepped down along the current direction, and the current direction at this time is a direction from the source terminal connected to the grounding potential toward the drain terminal. Accordingly, depending on the conduction of the NMOS transistor FET2, the terminal (X) shows a negative voltage, and the terminal voltage VN1 of the comparator COMP2 is transferred to high level. Since the high level transition of the terminal voltage VN1 is not delayed, terminal voltage VN2 of the delay circuit DL is similarly transferred to high level.

When the conductive state of NMOS transistor FET2 continues and the coil current IL1 decreases until the current value becomes zero, all power accumulated in the choke coil I1 is discharged to the output terminal (OUT) side. When the conductive state of NMOS transistor FET2 is further maintained, the terminal voltage of the choke coil L1 is maintained in high voltage state at the output terminal (OUT) side, and hence the coil current IL1 continues to flow at inclination of $di/dt=-VOUT/L$. The voltage at terminal (X) elevates from negative voltage to zero voltage and further to a positive voltage along with inversion of current direction of coil current IL1.

The comparator COMP2 detects when the voltage value of the terminal (X) is inverted from negative voltage to positive voltage, and the terminal voltage VN1 is inverted to low level. When the PWM/PFM variable control is selected, since the switch circuit SW is in conductive state, the drive signal VDL is transferred to low level corresponding to low level transition of terminal voltage VN1. Detecting the inversion of coil current IL1 flowing in the NMOS transistor FET2, the NMOS transistor FET2 is made non-conductive, and thus ordinary synchronous rectifying action is operated.

In the PWM fixed control shown in FIG. 2, the switch circuit SW is in non-conductive state. The low level transition of terminal voltage VN1 is delayed by the delay circuit DL, and the terminal voltage VN2 is transferred to low level. From low level transition of terminal voltage VN1 to low level transition of terminal voltage VN2, the NMOS transistor FET2 is maintained in conductive state, and the coil current IL1 flows in the inverting direction, that is, in a direction from the output terminal (OUT) side toward the choke coil L1 (FIG. 2 (3)). Part of power discharged to the output terminal (OUT) side is returned to the choke coil L1. At light load, the electric power supplied more than demanded by the load is accumulated in the output capacitor C1 as excess power, but at least part of it is returned to the choke coil L1. As a result, elevation of output voltage VOUT due to excess power accumulated in the output capacitor C1 may be decreased.

After the delay time by the delay circuit DL, when the terminal voltage VN2 is transferred to low level, the drive signal VDL is also transferred to low level, and the NMOS transistor FET2 is moved to non-conductive state. The electric power returned from the output terminal (OUT) side and accumulated in the choke coil L1 up to this moment is regenerated in the input terminal (IN) by way of the body diode of NMOS transistor FET1 (FIG. 2 (4)).

In the period of (3) and (4) in FIG. 2, switching control of NMOS transistor FET2 composes, together with body diode by NMOS transistor FET1, a boosting (step-up) DC-DC converter for supplying power from the output terminal (OUT) to input terminal (IN).

While the DC-DC converter is operating on PWM fixed control, the detection result of the comparator COMP2 for detecting inversion of current direction of coil current IL1 flowing in the NMOS transistor FET2 having synchronous rectifying action is delayed by the delay circuit DL, and the output voltage VOUT can be stepped up and returned to the input side by making use of the NMOS transistor FET2, thereby preventing risk of abnormal elevation of output voltage VOUT regardless of control by the control circuit 11.

In the DC-DC converter of synchronous rectifying type capable of selecting switching control of PWM/PFM variable control or PWM fixed control, it is appropriate and convenient to change over the conductive state of the switch circuit SW depending on the selection signal.

That is, while the PWM/PFM variable control is being selected, synchronous rectifying action is carried out, that is, the switch circuit SW conducts, and the NMOS transistor FET2 does not conduct depending on the inversion of coil current flowing in the NMOS transistor FET2. By PFM system and synchronous rectifying action at light load, while realizing a high power conversion efficiency, supply of excess power to the output terminal (OUT) side can be decreased. When the PFM fixed control is selected, the switch circuit SW does not conduct, and inversion of coil current IL1 flowing in the NMOS transistor FET2 is delayed by the delay circuit DL, and the NMOS transistor FET2 is made non-conductive. At light load, an excess power of the power supplied to the output terminal (OUT) side in every cycle of predetermined period by PWM system is returned to the choke coil L1, and is further regenerated in the input side. Abnormal elevation of output voltage VOUT can be prevented, and the power conversion efficiency is enhanced at the same time.

Figure 3:
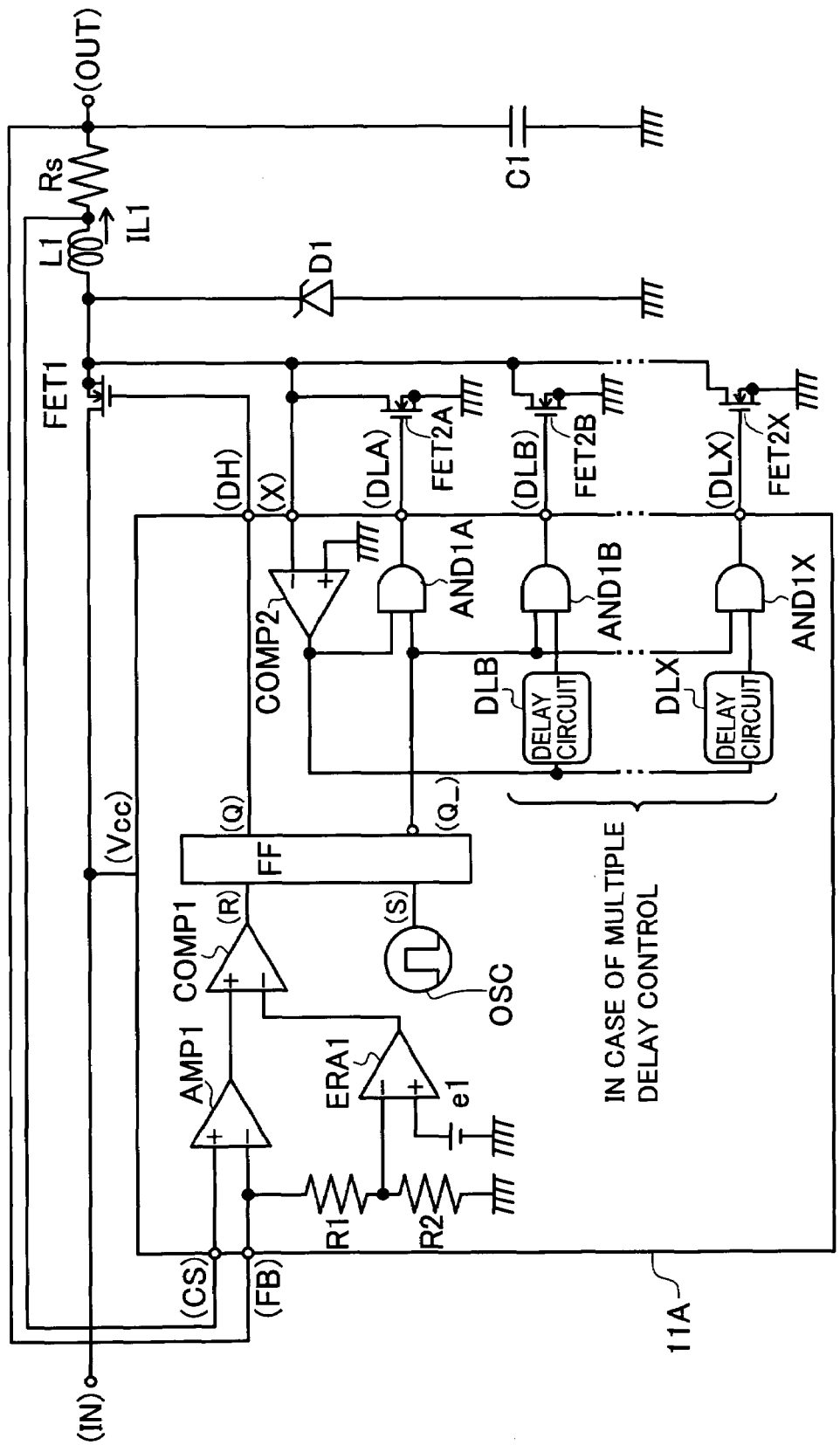
FIG. 3 is a circuit diagram of a modified example of the first embodiment applied in a step-down DC-DC converter.

FIG. 3 is a circuit diagram of a modified example of the first embodiment applied in a step-down DC-DC converter. This example comprises a plurality of synchronous transistors conducting at the time of discharge of electric power to the load. One of the transistors is used as a transistor mainly for synchronous rectifying action, and other transistor is used as a transistor mainly having a function of returning the excess power to the input side. The non-conductive timing of other transistor is delayed from the zero timing of discharge current toward the load after completion of power discharge. Since the conductive state is maintained for the delayed time, the discharge current is inverted, and the excess power at the load side is returned.

In the modified example of the first embodiment, output terminals (DLA) to (DLX) are provided instead of the output terminal (DL) of the first embodiment in FIG. 1, and instead of the NMOS transistor FET2, gate terminals of NMOS transistors FET2A to FET2X are connected. Further, instead of the delay circuit DL and AND gate circuit AND1, delay circuits DLB to DLX, and AND gate circuits AND1A to AND1X are provided. An output terminal (N1) of comparator COMP2 is connected to delay circuits DLB to DLX, and output terminals of delay circuits DLB to DLX are connected to input terminals of AND gate circuits AND1A to AND1X. Other input terminals of AND gate circuits AND1A to AND1X are commonly connected to reset terminal (R) of flip-flop circuit FF.

In the modified example in FIG. 3, NMOS transistor FET2A is further provided as a transistor having synchronous rectifying action, and further as shown in FIG. 2 (3), NMOS transistors FET2B to FET2X are provided as transistors for mainly passing coil current IL1 in the inversion direction from output terminal (OUT) side to choke coil L1.

When the comparator COMP2 detects inversion of coil current IL1, the output terminal of AND gate circuit AND1A is inverted to low level, and the NMOS transistor FET2A is made non-conductive. At this moment, the NMOS transistors FET2B to FET2X continue to be conductive. At each gate terminal the output terminal of delay circuits DLB to DLX is connected, and the timing of transferring the gate terminal of the NMOS transistor FET2A to low level is delayed.

Herein, by adjusting the delay time of the delay circuits DLB to DLX, the non-conductive timing of transistors FET2B to FET2X can be adjusted, and the coil current IL1 when returning the output side excess power to the input side can be controlled. It is hence possible to control so as to decrease the number of conductive transistors FET2B to FET2X depending on the time, and the current driving capacity or ON resistance can be controlled depending on the time.

In the modified example in FIG. 3, having the delay circuits DLB to DLX in each one of NMOS transistors FET2B to FET2X, the delay time until OFF is set individually in the transistors FET2B to FET2X, but the insertion structure of delay circuits is not limited to this example alone. By connecting delay circuits in series so as to add the delay time sequentially, the terminal timing the desired delay time can be connected to the AND gate circuits AND1A to AND1X.

Further, the NMOS transistors FET2B to FET2X can be composed by varying the transistor size individually. Some of the NMOS transistors FET2B to FET2X may be operated at constant current. Together with adjustment of delay time, the current capacity of the coil current IL1 may be adjusted with a further greater degree of freedom.

Figure 4:
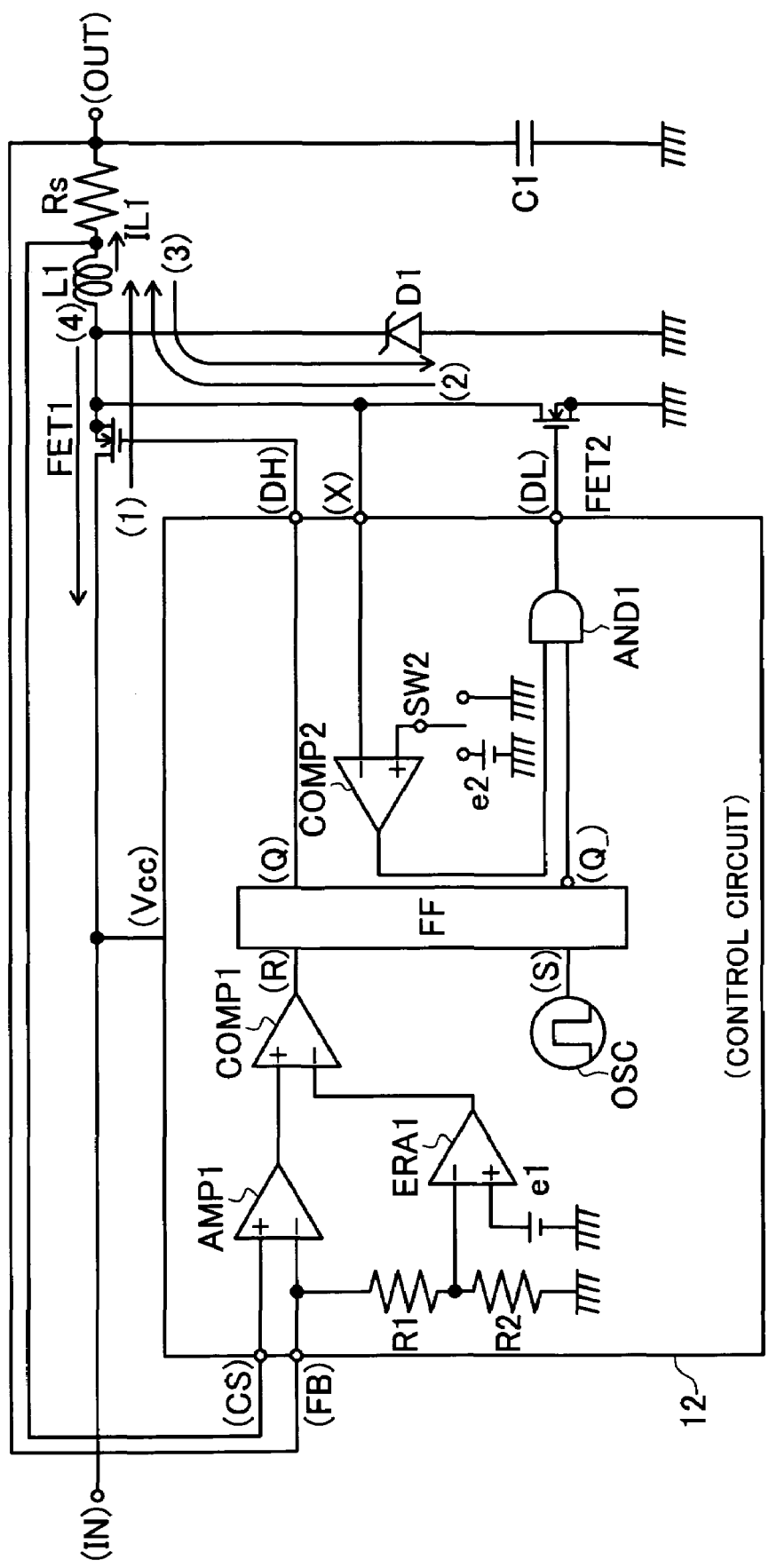
FIG. 4 is a circuit diagram of a second embodiment applied in a step-down DC-DC converter.

FIG. 4 is a circuit diagram of a second embodiment applied in a step-down DC-DC converter. The non-conductive timing of synchronous transistor conducting when discharging electric power to the load can be set as the timing of returning the load side excess power by inversion of the discharge current by setting offset in the detection of discharge current. By addition of offset, the non-conductive transition of synchronous transistor is delayed, and the load side excess power is returned.

In a control circuit 12 shown in FIG. 4, instead of the switch circuit SW and delay circuit DL in the control circuit 11 in FIG. 1, switch circuit SW2 and offset unit e2 are provided. At the input terminal of the AND gate circuit AND1, an output terminal of comparator COMP2 is connected instead of output terminal (N2) of delay circuit DL. Other circuit configuration is same as in FIG. 1, and the explanation is omitted.

The switch circuit SW2 connects either grounding potential or offset unit e2 to the non-inverting input terminal of the comparator COMP2. The offset unit e2 is a circuit for adding a positive offset voltage e2 to the grounding potential.

The switch circuit SW2 connects the grounding potential to the non-inverting input terminal of the comparator COMP2 when the PWM/PFM variable control is selected. When the voltage of the terminal (X) connected to the inverting input terminal is inverted to positive, the comparator COMP2 outputs a low level signal, and the NMOS transistor FET2 is made non-conductive. When the coil current IL1 flowing in the NMOS transistor FET2 is inverted, the terminal (X) is changed to positive voltage, and by detecting this, the NMOS transistor FET2 is controlled to be non-conductive. Thus, the NMOS transistor FET2 performs synchronous rectifying action.

When the PWM fixed control is selected, offset unit e2 is connected to the non-inverting input terminal of the comparator COMP2. When the voltage of the terminal (X) connected to the inverting input terminal exceeds the offset voltage e2, the comparator COMP2 outputs a low level signal, and the NMOS transistor FET2 is made non-conductive. After the coil current IL1 flowing in the NMOS transistor FET2 is inverted, the terminal (X) reaches the offset voltage e2, and the NMOS transistor FET2 is controlled to be non-conductive. After inversion of the coil current IL1, by passing coil current IL1 into the choke coil I1 from the output terminal (OUT) side, the excess power supplied to the output terminal (OUT) side can be returned.

When the offset unit e2 is connected to the comparator COMP2, the circuit operation is same as in FIG. 2. By adding offset voltage e2 to the comparator COMP2, the coil current IL1 is set to flow by a predetermined current value in the inverting direction when the NMOS transistor FET2 is made non-conductive.

Figure 5:
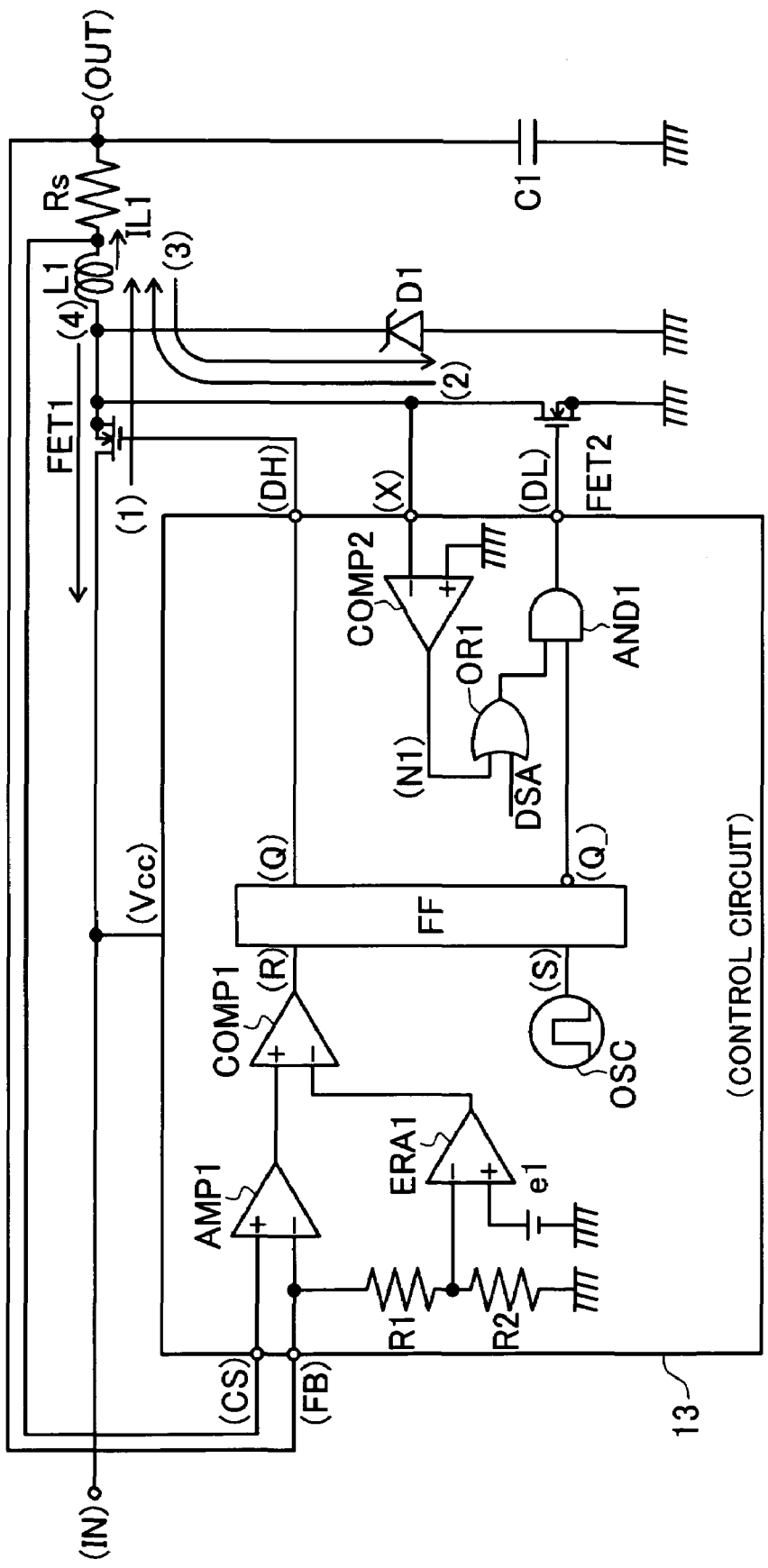
FIG. 5 is a circuit diagram of a third embodiment applied in a step-down DC-DC converter.

FIG. 5 is a circuit diagram of a third embodiment applied in a step-down DC-DC converter. In a DC-DC converter capable of selecting the PWM fixed control and PWM/PFM variable control, the conduction control of synchronous transistor is made non-conductive by preventing counterflow of coil current by having rectifying action in the PWM/PFM variable control, and the counterflow of coil current is permitted and conductive state is maintained in the PWM fixed control. In the PWM fixed control for supplying power to the load side in every period, it is composed to return the load side excess power in every period.

In a control circuit 13 shown in FIG. 5, instead of the switch circuit SW and delay circuit DL in the control circuit 11 in FIG. 1, an OR gate circuit OR1 is provided. An input terminal of OR gate circuit OR1 is connected to an output terminal of comparator COMP2, and receives selection signal DSA of PWM fixed control. The selection signal DSA is a signal which is high level when selecting the PWM fixed control. An output terminal of OR gate circuit OR1 is connected to an input terminal of AND gate terminal AND1. Other input terminal of AND gate terminal AND1 is connected to an output terminal (Q_) of flip-flop circuit FF. Other circuit configuration is same as in FIG. 1, and the explanation is omitted.

When the PWM fixed control is selected, the selection signal DSA is at high level. The output terminal of OR gate circuit OR1 is fixed at high level regardless of the output terminal (N1) of comparator COMP2. The AND gate circuit AND1 transmits a signal from output terminal (Q_) of flip-flop circuit FF to output terminal (DL). Herein, the signal from the output terminal (Q_) is an inverted signal of the signal from the output terminal (Q). The NMOS transistor FET1 and NMOS transistor FET2 repeat conduction and non-conduction mutually in reverse phase. In the switching control of PWM system, by input voltage VIN and output voltage VOUT, the time division of conduction of each transistor in predetermined period is constant. At light load, the NMOS transistor FET2 is maintained in conductive state for a predetermined time regardless of counterflow of coil current IL1.

When the PWM/PFM variable control is selected, the selection signal DSA is at low level. The output terminal of OR gate circuit OR1 outputs a signal in phase with terminal signal VN1 of comparator COMP2. The terminal signal VN1 is maintained at high level as far as the coil current IL1 is flowing toward the output terminal (OUT) side, and is inverted to low level when counterflow is detected. The AND gate circuit AND1, in the case of high level terminal signal NV1, transmits a signal from output terminal (Q_) of flip-flop circuit FF to output terminal (DL), and when the terminal signal VN1 is inverted to low level, a signal of low level is outputted. At light load, the NMOS transistor FET2 is made non-conductive depending on the counterflow of coil current IL1.

When the control circuit 13 is set in PWM fixed control, the circuit operation at light load is explained by referring to FIG. 6. Different from FIG. 2, the NMOS transistor FET2 maintains the conductive state regardless of counterflow of the coil current IL1. Accordingly, the coil current IL1 is flowing in either NMOS transistor FET1 or NMOS transistor FET2 in each period of switching action.

When the drive signal VDH is at high level, the NMOS transistor FET1 conducts. The coil current increases at a predetermined time rate. When the drive signal VDL is at high level, the NMOS transistor FET2 conducts. The coil current decreases at a predetermined time rate. The coil current IL1 flows like sawtooth wave.

The average of sawtooth flow of coil current IL1 is the load current ILD flowing into the load. When the load current ILD consumed at the load decreased until coming to light load, the operation waveform is as shown in FIG. 6. In the light load state shown in FIG. 6, the bottom value of the current value of sawtooth coil current IL1 is a negative value (FIG. 6 (3), (4)).

In the period of (2) and (3), the drive signal VDL is at high level, and the NMOS transistor FET2 is in conductive state. In the region of (2), the electric power accumulated in the choke coil L1 is discharged to the output terminal (OUT) side, and when the coil current IL1 becomes zero, discharge is complete. In the subsequent region of (3), since the conductive state of the NMOS transistor FET2 is maintained, the coil current IL1 flows from the output terminal (OUT) side toward the choke coil L1, and the excess power is returned to the choke coil L1.

After the period of (3), the drive signal VDL is transferred to low level, and the drive signal VDH is transferred to high level, and the NMOS transistor FET1 is in conductive state. In the initial stage of this period, that is, in the region of (4), the electric power accumulated in the choke coil L1 is regenerated at the input terminal (IN) side. When regeneration is complete, the coil current IL1 is inverted, and the coil current IL1 begins to flow from the input terminal (IN) side toward the choke coil L1. The electric power begins to be accumulated in the choke coil L1, and a next cycle is started.

In PWM fixed control, for a predetermined time rate in one period determined by the input voltage VIN and output voltage VOUT, the NMOS transistor FET2 is maintained in conductive state. Therefore, at light load, the coil current IL1 flows in the inverting direction, that is, from the output terminal (OUT) side toward the choke coil L1 (FIG. 6 (3)). As a result, part of the electric power discharged to the output terminal (OUT) side is returned to the choke coil L1. The electric power supplied more than demanded by the load is accumulated in the output capacitor C1 as excess power, but at least part of this is returned to the choke coil L1. Thus, elevation of output voltage VOUT by excess power accumulated in the output capacitor C1 can be decreased.

The NMOS transistor FET2 is non-conductive, and the NMOS transistor FET1 is conductive. The electric power returned from the output terminal (OUT) side and accumulated in the choke coil L1 in the period of (3) is regenerated at the input terminal (IN) side by conduction of the NMOS transistor FET1 (FIG. 2 (4)). In the case of FIG. 2, power is regenerated through the body diode of NMOS transistor FET1, but in the third embodiment (FIG. 5, FIG. 6), it is regenerated by conduction of NMOS transistor FET1. Thus, the power consumption in the regeneration path of coil current IL1 may be further decreased.

Herein, switching control of NMOS transistors FET2 and FET1 in the period of (3) and (4) in FIG. 6 composes a step-up DC-DC converter for supplying electric power from the output terminal (OUT) to the input terminal (IN).

When the DC-DC converter is operating on PWM fixed control, using the NMOS transistor FET2, the output voltage VOUT can be boosted and returned to the input side, and abnormal rise of output voltage VOUT can be prevented regardless of control by control circuit 13.

FIG. 7 is a circuit diagram of first embodiment applied in a step-up DC-DC converter. The non-conductive timing of the synchronous transistor for conducting when discharging electric power to the load is delayed from the zero timing of the discharge current toward the load after completion of power discharge. For the delayed time, the synchronous transistor is maintained in conductive state, and the discharge current is inverted, and the excess power at the load side is returned.

One terminal of choke coil L1 is connected to input terminal (IN), and other terminal is connected to drain terminal of NMOS transistor FET3 and source terminal of NMOS transistor FET4 by way of sense resistance Rs. The source terminal of NMOS transistor FET3 is connected to a grounding potential, and the drain terminal of NMOS transistor FET4 is connected to output terminal (OUT). Gate terminals of NMOS transistors FET3 and FET4 are connected respectively to output terminals (DH), (DL) of control circuit 21 described below. In the output terminal (OUT), further, an output capacitor C1 is connected against the grounding potential in order to accumulate the electric power supplied by way of choke coil L1.

Herein, back gate terminals are connected to source terminals of the NMOS transistors FET3, FET4, and generally a body diode is incorporated toward the drain terminal.

The control circuit 21 has a circuit configuration for performing switching control by PWM system by current mode control. The amplifier AMP1, error amplifier ERA1, comparator COMP1, flip-flop circuit FF, and AND gate circuit AND1 for performing switching control by PWM system are same as the control circuit 11 in FIG. 1 in the circuit configuration, action and effect.

The comparator COMP2, delay circuit DL and switch circuit SW are also same in circuit configuration, action and effect. Different from FIG. 1, the input terminal of comparator COMP2 is connected to both terminals of the sense resistance Rs by way of terminals (CS+) and (CS−). It is positive when the coil current IL1 is flowing from the choke coil L1 to the output terminal (OUT) side, and a high level signal is applied to the output terminal (N1).

When the control circuit 21 is set in PWM fixed control, the circuit operation at light load is same as in FIG. 2. When the drive signal VDH outputted from the output terminal (DH) is transferred to high level, the NMOS transistor FET3 conducts. As a result, the coil current IL1 flowing from the input terminal (IN) into the choke coil L1 is elevated at a predetermined time inclination, and the electric power is accumulated in the choke coil L1.

When the output voltage of the amplifier AMP1 reaches the output voltage of the error amplifier ERA1, the NMOS transistor FET4 conducts. A current path is formed from the choke coil L1 to the output terminal (OUT) side, and the electric power accumulated in the choke coil L1 is discharged to the output terminal (OUT) side. At this time, the coil current IL1 decreases at a time inclination.

In the case of switching control by PWM system, power is supplied to the output terminal (OUT) side in every period, and the power supply may be excess at light load, but since the coil current IL1 continues to flow after the current direction is inverted, the excess power is returned to the choke coil L1. The electric power returned from the output terminal (OUT) side and accumulated in the choke coil L1 is regenerated at the input terminal (IN) side depending on the conduction of the NMOS transistor FET3 or by way of the body diode of the NMOS transistor FET3.

FIG. 8 is a circuit diagram of a fourth embodiment applied in a boosting (step-up) DC-DC converter. This is a case of performing conduction control of synchronous transistor depending on the output voltage at the moment of inversion of discharge current toward the output terminal. At the time of inversion of discharge current, if the output voltage is below a predetermined voltage value, the synchronous transistor does not conduct and synchronous rectifying operation is conducted, and if the output voltage is higher than a predetermined voltage value, the synchronous transistor maintains conductive, and the excess power is returned.

In a control circuit 22 shown in FIG. 8, instead of the switch circuit SW and delay circuit DL in the control circuit 21 in FIG. 7, comparator COMP3 and NAND gate circuit NAND1 are provided. A predetermined voltage value e3 is connected to non-inverting input terminal of the comparator COMP3, and a voltage dividing point by resistance elements R1, R2 is connected to inverting input terminal. Output terminals of comparators COMP2 and COMP3 are connected to an input terminal of NAND gate circuit NAND1. An output terminal of NAND gate circuit NAND1 is connected to an input terminal of AND gate circuit AND1. Other circuit configuration is same as in FIG. 7 and the detail is omitted.

In the comparator COMP2, the current direction of the coil current IL1 is monitored. In the comparator COMP3, the output voltage VOUT is compared with a voltage value set by the predetermined voltage value e3. In the counterflow period of coil current IL1, if the output voltage VOUT is over the voltage value set by the predetermined voltage value e3, the output voltage of the NAND gate circuit NAND1 becomes high level, and the drive signal VDL is high level. As a result, the NMOS transistor FET4 conducts. Excessive power can be returned to the choke coil L1 from the output terminal (OUT) side. If the output voltage VOUT is within the voltage value set by the predetermined voltage value e3, the output voltage of the NAND gate circuit NAND1 becomes low level depending on the counterflow of the coil current IL1, and the drive signal VDL becomes low level. The NMOS transistor FET4 does not conduct, and synchronous rectifying operation is performed.

FIG. 9 is a circuit diagram of an example of boosting/step-down DC-DC converter. Using choke coil L1 and sense resistance Rs as main elements, a step-down DC-DC converter is composed of NMOS transistors FET1 and FET2 provided at the input terminal (IN) side, and a boosting (step-up) DC-DC converter is composed of NMOS transistors FET3 and FET4 provided at the output terminal (OUT) side. By switching control of NMOS transistors FET1 and FET2 by output terminals (DH1) and (DL1) of a control circuit 31, an output voltage VOUT stepped down by the output terminal (OUT) is generated. By switching control of NMOS transistors FET3 and FET4 by output terminals (DH2) and (DL2), an output voltage VOUT boosted by the output terminal (OUT) is generated.

In this case, in order to establish the current path for coil current IL1, in step-down operation, in addition to switching operation of NMOS transistors FET1 and FET2, the NMOS transistor FET4 is maintained in conductive state, and in boosting operation, in addition to switching operation of NMOS transistors FET3 and FET4, the NMOS transistor FET1 is maintained in conductive state, and in all other respects, the step-down and boosting (step-up) control can be individually controlled. Therefore, in the boosting/step-down DC-DC converter shown in FIG. 9, too, the first to fourth embodiments may be similarly applied in the step-down type and boosting type.

As described specifically herein, according to the control circuit of DC-DC converter and its control method of the embodiments, when discharging the accumulated power in the choke coil L1 as an example of inductive element to the output terminal (OUT) side, the NMOS transistor FET2 or FET4 as second switching element is made to conduct. In this case, when the conductive state of the NMOS transistor FET2 or FET4 is maintained longer than the power discharge period of the choke coil L1, as an example of first current discharging power to the output terminal (OUT) side, the current direction of coil current IL1 is inverted. The current flows toward the choke coil L1 from the output terminal (OUT) side, and the power at the output terminal (OUT) side is moved and accumulated. When the power consumption at the load is small, the excess power can be returned to the choke coil L1. The excess power accumulated at the output terminal (OUT) side can be decreased, and elevation of output voltage VOUT due to excess power can be suppressed.

Further, after the NMOS transistor FET2 or FET4 is made non-conductive, by conducting the NMOS transistor FET1 or FET3, or since the NMOS transistor FET1 or FET3 has a body diode, the power returned to the choke coil L1 is regenerated at the input terminal (IN) side. Excessive power can be returned to the input terminal (IN) side, and the power conversion efficiency of DC-DC converter can be enhanced.

In particular, when applied in a case of switching operation by PWM system at light load, switching operation is done in predetermined period, and if excess power is discharged to the output terminal (OUT) side in every period, the excess power can be returned to the choke coil L1 in every period, and elevation of output voltage VOUT can be suppressed. Without requiring dummy load such as bleeder resistance at the output terminal (OUT) side, abnormal elevation of output voltage VOUT can be suppressed. In the case of a DC-DC converter capable of selecting the switching control method between the PWM fixed control and PWM/PFM variable control, when the PWM fixed control is selected, regeneration of excess power by counterflow of coil current IL1 is possible. Abnormal elevation of output voltage VOUT can be suppressed, and the power conversion efficiency is enhanced.

Instead of the NMOS transistor FET2, a plurality of NMOS transistors FET2B to FET2X may be provided, and when inverting the coil current IL1, by making non-conductive at different delay timing, the coil current IL1 can be controlled when returning the output side excess power to the input side.

The invention is not limited to these embodiments alone, but may be changed and modified in various manners within the scope not departing from the true spirit of the invention.

Control by delay circuit DL, control by offset unit e2, and detection control of output voltage VOUT can be freely combined and applied. In the embodiments, the DC-DC converter of current mode control is explained, but the invention is not limited to this example alone. It can be similarly applied to the DC-DC converter of voltage mode control.

The configuration of using a plurality of NMOS transistors FET2B to FET2X in the control of coil current IL1 when returning the output side excess power to the input side is not limited to the first embodiment, but may be similarly applied in the second to fourth embodiments. For example, in the second embodiment, having individually different plurality of offset voltage values e2, the comparison result by the comparator COMP2 may be given to each one, and non-conductive control of NMOS transistors FET2B to FET2X may be realized. In the fourth embodiment, having individually different plurality of predetermined voltage values e3, the comparison result by the comparator COMP3 may be given to each one, and non-conductive control of NMOS transistors FET2B to FET2X may be realized.

According to the invention, in the DC-DC converter of synchronous rectifying system, at light load, by returning the excess power discharged to the load side to the inductive element, and further returning to the input side, excessive elevation of output voltage is suppressed and the control voltage valve is improved, and therefore the DC-DC converter control circuit capable of enhancing the power conversion efficiency and its control method can be presented.

What is claimed is:

1. A control circuit of a synchronous rectifying DC-DC converter, being a synchronous rectifying DC-DC converter having a first switching element for conducting when electric power is accumulated in an inductive element, and a second switching element for conducting by synchronous rectifying switching control corresponding to discharge period of electric power accumulated in the inductive element to a load, comprising:

a detector for monitoring a first current flowing with a negative inclination to the time by conduction of the second switching element, and detecting when reaching a predetermined current value by inversion of current direction, and a conduction controller for making the second switching element non-conductive depending on the detection result by the detector.

2. The control circuit of a synchronous rectifying DC-DC converter of claim 1, wherein part of power discharged to the load side is accumulated again in the inductive element by the predetermined current value.

3. The control circuit of a synchronous rectifying DC-DC converter of claim 1, wherein the detector has an offset unit corresponding to the predetermined current value.

4. The control circuit of a synchronous rectifying DC-DC converter of claim 1, wherein the detector includes a counterflow detector for detecting inversion of current direction of the first current, and a delay unit for delaying the detection result by the counterflow detector, and the conduction controller makes the second switching element non-conductive depending on the output of the delay unit.

5. The control circuit of a synchronous rectifying DC-DC converter of claim 1, wherein the detector monitors the voltage between terminals of the second switching element.

6. The control circuit of a synchronous rectifying DC-DC converter of claim 1, wherein the detector monitors the voltage between terminals of a detection resistance provided in the current path of flow of the first current.

7. The control circuit of a synchronous rectifying DC-DC converter of claim 1, further comprising:

at least one third switching element connected parallel to the second switching element, and conducting instead of the second switching element or together with the second switching element, when inverting the current direction of the first current, wherein the conduction controller makes the third switching element non-conductive, instead of the second switching element or together with the second switching element.

8. The control circuit of a synchronous rectifying DC-DC converter of claim 7, wherein the detector includes a counterflow detector for detecting inversion of current direction of the first current, and at least one delay unit provided corresponding to the third switching element, or the second and third switching elements, for delaying the detection result by the counterflow detector, and the conduction controller makes the third switching element non-conductive, instead of the second switching element or together with the second switching element.

9. A control circuit of a synchronous rectifying DC-DC converter, being a synchronous rectifying DC-DC converter having a first switching element for conducting when electric power is accumulated in an inductive element, and a second switching element for conducting by synchronous rectifying switching control corresponding to discharge period of electric power accumulated in the inductive element to a load, comprising:

a counterflow detector for monitoring a first current flowing with a negative inclination to the time by conduction of the second switching element, and detecting the inversion of current direction, a voltage detector for detecting when the output voltage of the synchronous rectifying DC-DC converter is equal to or less than a predetermined voltage, and a conduction controller for making the second switching element non-conductive depending on the detection result by the counterflow detector and the voltage detector.

10. The control circuit of a synchronous rectifying DC-DC converter of claim 9, further comprising:

at least one third switching element connected parallel to the second switching element, and conducting instead of the second switching element or together with the second switching element, when inverting the current direction of the first current, wherein the conduction controller makes the third switching element, or the second and third switching elements non-conductive.

11. The control circuit of a synchronous rectifying DC-DC converter of claim 9, wherein the predetermined voltage value is a voltage equal to or higher than the control voltage value at the output voltage.

12. A control circuit of a synchronous rectifying DC-DC converter, being a control circuit of a synchronous rectifying DC-DC converter capable of selecting control of a synchronous rectifying DC-DC converter having a second switching element for conducting by synchronous rectifying switching control corresponding to discharge period of electric power accumulated in an inductive element to a load, between PWM fixed control for fixing the repetition period of operation cycle at predetermined period regardless of the load power amount, and PWM/PFM variable control for selecting the PFM system for expanding and contracting the repetition period of operation cycle depending on the load power amount at light load, comprising:

a counterflow detector for monitoring a first current flowing with a negative inclination to the time by conduction of the second switching element, and detecting the inversion of current direction, and a conduction controller for making the second switching element non-conductive depending on the detection result by the counterflow detector when the PWM/PFM variable control is selected, and maintaining the conductive state of the second switching element until power accumulation into the inductive element is started regardless of the detection result when the PWM fixed control is selected.

13. A control method of a synchronous rectifying DC-DC converter, being a synchronous rectifying DC-DC converter having a first current path for conducting when electric power is accumulated in an inductive element, and a second current path for conducting by synchronous rectifying switching control corresponding to discharge period of electric power accumulated in the inductive element to a load, wherein a first current flowing with a negative inclination to the time is detected by conduction of the second current path until reaching a predetermined current value by inversion of current direction, and the second current path is made non-conductive depending on the detection result.

14. The control method of a synchronous rectifying DC-DC converter of claim 13, wherein the predetermined current value is determined by measuring the voltage drop due to flow of the first current into the impedance component provided in the second current path.

15. The control method of a synchronous rectifying DC-DC converter of claim 13, wherein the predetermined current value is determined by adding a delay to the inversion of current direction in the first current.

16. The control method of a synchronous rectifying DC-DC converter of claim 13, wherein the second current path has a discharge path of power accumulated in the inductive element to the load, and at least one current direction inverting path of the first current, and depending on the detection result, the current direction inverting path, or the discharge path and the current direction inverting path are made non-conductive.

17. The control method of a synchronous rectifying DC-DC converter of claim 13, wherein the predetermined current value is determined by adding a delay to the inversion of current direction in the first current, depending on the current direction inverting path, or the discharge path and the current direction inverting path.

18. A control method of a synchronous rectifying DC-DC converter, being a synchronous rectifying DC-DC converter having a first current path for conducting when electric power is accumulated in an inductive element, and a second current path for conducting by synchronous rectifying switching control corresponding to discharge period of electric power accumulated in the inductive element to a load, wherein a first current flowing with a negative inclination to the time is detected when the current direction is inverted by conduction of the second current path, and the second current path is made non-conductive when the current direction of the first current is inverted and the output voltage is equal to or lower than a predetermined voltage value.

19. The control method of a synchronous rectifying DC-DC converter of claim 18, wherein the second current path has a discharge path of power accumulated in the inductive element to the load, and at least one current direction inverting path of the first current, and depending on the current direction of the first current being in inverted state and the output voltage being equal to or smaller than the predetermined voltage value, the current direction inverting path, or the discharge path and the current direction inverting path are made non-conductive.

20. The control method of a synchronous rectifying DC-DC converter of claim 18, wherein the predetermined voltage value is a voltage equal to or higher than control voltage value at the output voltage.

21. A control method of a synchronous rectify in DC-DC converter, being a control method of a synchronous rectifying DC-DC converter capable of selecting control of a synchronous rectifying DC-DC converter having a first current path for conducting when electric power is accumulated in an inductive element, and a second current path for conducting by synchronous rectifying switching control corresponding to discharge period of electric power accumulated in the inductive element to a load, between PWM fixed control for fixing the repetition period of operation cycle at predetermined period regardless of the load power amount, and PWM/PFM variable control for selecting the PFM system for expanding and contracting the repetition period of operation cycle depending on the load power amount at light load, wherein a first current flowing with a negative inclination to the time is detected when the current direction is inverted by conduction of the second current path, and the second current path is made non-conductive depending on the detection result of inversion of current direction when the PWM/PFM variable control is selected, while the conductive state of the second current path is maintained until accumulation of electric power into the inductive element is started regardless of the result of detection.

* * * * *